United States Patent [19]
Maistre

[11] 4,366,658
[45] Jan. 4, 1983

[54] ANNULAR THREE-DIMENSIONAL STRUCTURE

[75] Inventor: Michel Maistre, Bordeaux, France

[73] Assignee: Societe Europeenne de Propulsion, Puteaux, France

[21] Appl. No.: 224,479

[22] Filed: Jan. 12, 1981

[30] Foreign Application Priority Data

Jan. 17, 1980 [FR] France .................. 80 01009

[51] Int. Cl.³ .................................................. B32B 5/12
[52] U.S. Cl. ........................................ 52/648; 52/224; 428/105
[58] Field of Search .................. 52/224, 648; 428/105, 428/113; 156/73.6, 89

[56] References Cited

U.S. PATENT DOCUMENTS

| | | | |
|---|---|---|---|
| 3,893,270 | 7/1975 | Schupack et al. | 52/224 X |
| 3,949,126 | 4/1976 | Crawford | 428/113 |
| 4,092,811 | 6/1978 | Lin et al. | 52/224 |
| 4,168,337 | 9/1979 | Maistre | 428/105 |
| 4,252,588 | 2/1981 | Kratsch et al. | 428/105 X |
| 4,254,599 | 3/1981 | Maistre | 52/224 |
| 4,268,560 | 5/1981 | Maistre | 428/105 |
| 4,328,272 | 5/1982 | Maistre | 428/105 |

FOREIGN PATENT DOCUMENTS

| | | | |
|---|---|---|---|
| 794592 | 9/1968 | Canada | 52/224 |
| 2308499 | 11/1976 | France | 428/105 |

Primary Examiner—J. Karl Bell
Attorney, Agent, or Firm—Staas & Halsey

[57] ABSTRACT

Annular three-dimensional structure formed by regularly criss-crossed filiform elements, divided in a plurality of families of elements occupying the same place within the structure arranged identically within the said structure. In order to have an undelaminatable structure with a selectable space distribution of its mechanical or physical properties, said structure includes two families of helical elements arranged in cylindrical sheets according to helices of identical pitch but of opposite direction, two families of oblique meridian elements arranged in meridian sheets and with opposite inclinations with respect to the axis, and at least a fifth family of radial elements arranged in meridian sheets, or of circumferential elements arranged in cylindrical sheets, or of axial elements arranged in meridian or cylindrical sheets.

8 Claims, 3 Drawing Figures

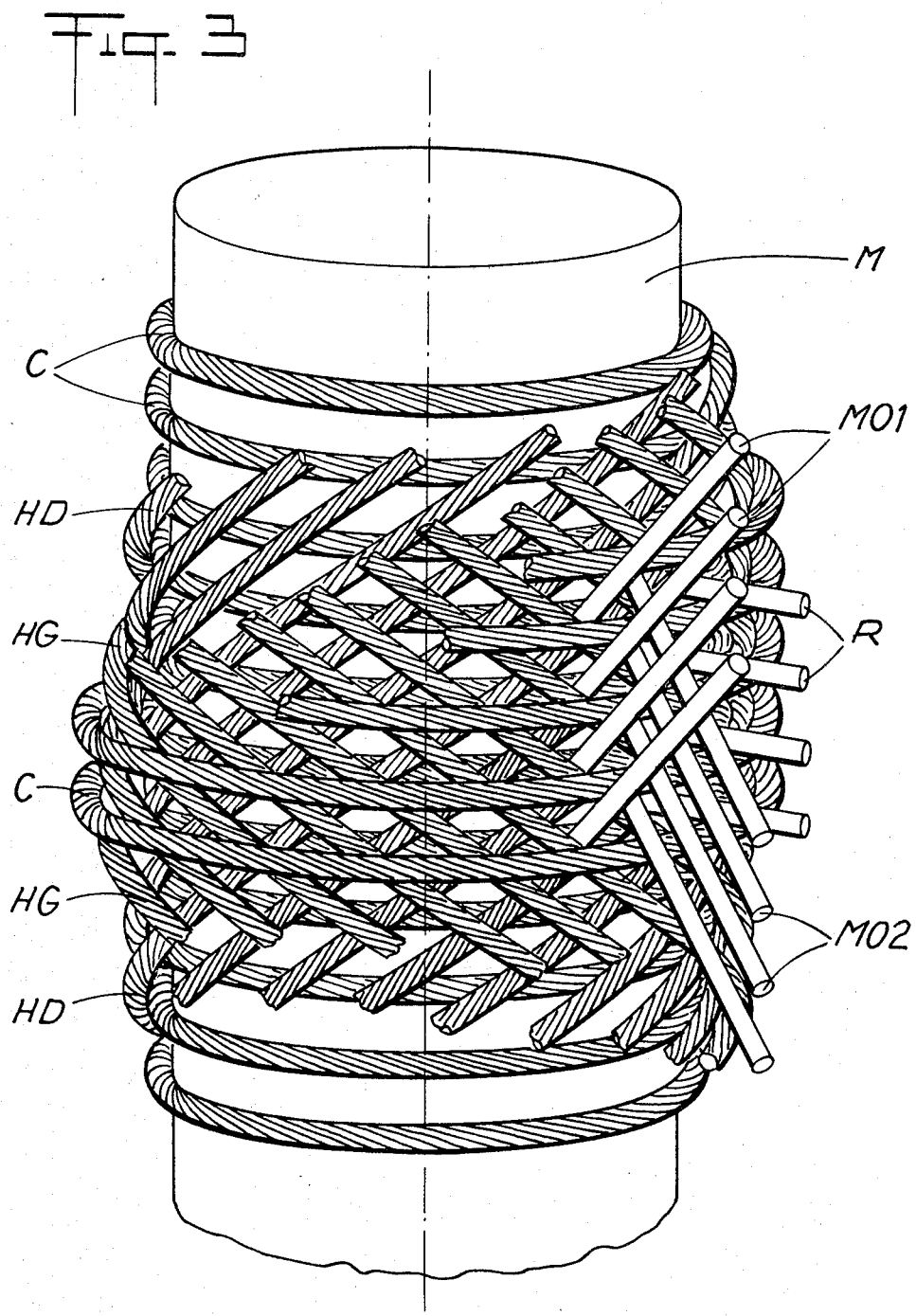

ANNULAR THREE-DIMENSIONAL STRUCTURE

BACKGROUND AND SUMMARY OF INVENTION

The present invention relates to an annular three-dimensional structure constituted by the regular crisscrossing of filiform elements distributed in a plurality of families of elements, each family being composed of elements of a same type occupying the same particular position within the structure.

A structure of this type can be used for example as reinforcement structure for a composite material included in the production of parts being symmetrical about an axis of revolution and needing to show good cohesion and uniform properties in every points of one circumference. A typical application of such a structure is the production of a carbon-carbon composite material (reinforcement structure made of filiform carbon elements densified by a carbon matrix) usable in the construction of nozzles or parts of nozzles for rocket engines.

Several types of three-dimensional structures have already been proposed.

For example it is known to produce annular structures consisting of a family of radial rectilinear elements, i.e. perpendicular to the axis of the structure, of a family of axial rectilinear elements, i.e. parallel to the axis of the structure, and of a family of incurved circumferential elements. By circumferential elements are meant here elements arranged in cylindrical sheets either in the form of separate circular spires situated at regular intervals in planes perpendicular to the axis, or in the form of helical windings of low pitch with spires whose inclination with respect to the planes perpendicular to the axis is as small as possible. Such a structure is described in French Patent Application No. 2,408,676.

It is also known to produce an annular structure constituted of a first family of incurved helical elements arranged in co-axial cylindrical sheets according to helical paths of identical pitch and direction, of a second family of incurved helical elements arranged in co-axial cylindrical sheets alternated with those of the first family according to helical paths of same pitch as the first family but of different direction, and of a family of radial rectilinear elements.

These two known annular structures composed of three families have a point in common in that they both comprise two families arranged in adjacent layers separated one from the other by separating surfaces traversed only by rectilinear elements of the radial element family. Said rectilinear elements cannot ensure a complete locking of the layers of the other two families. There is then for these layers a possibility of delamination, i.e. of decohesion in parallel to the radial elements. It is conceivable that such a possibility should be highly undesirable when one of the intended applications is the construction of parts requiring great cohesion.

In order to overcome this risk of decohesion, it has been proposed in U.S. Patent Application Ser. No. 19,571, to provide an annular structure constituted of four families of filiform elements, and in particular a structure of the type comprising first and second families of meridian rectilinear elements, oblique with respect to the axis of the structure and forming in each family, meridian sheets regularly distributed about the axis of the structure, and third and fourth families of helical elements forming, in each family, cylindrical sheets of the same axis as the structure and distributed regularly in radial direction, the inclination with respect to the axis of the elements of the first family being equal but opposite to that of the elements of the second family and the helical paths of the elements of the third family having the same pitch as those of the elements of the fourth family, but with an opposite orientation.

By oblique meridian element is meant here an element situated in a meridian plane and forming with the axis of the structure a different angle of 0°, 90° and 180°.

The adjacent layers of two families are undoubtedly locked together by the elements of the other two families traversing the separation surfaces between said layers with different inclinations with respect to the said surfaces. Nonetheless, this four-family structure can only be achieved by following certain dispositions, which limits the possible applications of the structure.

It is therefore the object of the present invention to propose an annular three-dimensional structure presenting no risk of decohesion and being adaptable to satisfy special requirements relative for example to the arrangement of the elements or to the space distribution of the properties of the structure, whilst preserving a high value of reinforcement element volume content, i.e. keeping high the ratio of the real volume occupied by the elements of the structure to the apparent volume thereof.

This object is reached with a structure of the aforesaid type, comprising two families of oblique meridian elements and two families of helical elements, which structure is characterized in that it comprises at least a fifth family selected from the group constituted by a family of radial elements forming meridian sheets distributed regularly about the axis of the structure, a family of circumferential elements forming cylindrical sheets having the same axis as the structure and distributed regularly in radial direction and a family of axial elements forming meridian or cylindrical sheets distributed regularly in the structure.

The elements of each family constituting the structure form meridian or cylindrical sheets in which they are spaced out at regular intervals and have the same orientation.

The first and second family being composed of oblique meridian elements with equal but opposite inclination with respect to the axis of the structure, form a virtually symmetrical assembly with respect to meridian planes and to planes perpendicular to the axis. It is practically the same with the assembly constituted by the third and fourth family since these are composed of elements arranged in concentric cylindrical layers according to helical paths of identical pitch but of opposite orientation. Since the or each additional family is a family of radial, circumferential or axial elements, the structure, on the whole, is virtually symmetrical according to meridian planes and to planes perpendicular to the axis.

Another advantage of the structure according to the invention resides in the fact that the adjunction of a family of radial, circumferential or axial elements permits, depending on the need, to give certain mechanical or physical properties to the parts to be produced, due to the presence of reinforcement in one or more of the three main "directions" of the ring.

Also, due to the fact that the structure according to the invention comprises at least five different families, it is possible to obtain a balanced structure approaching isotropy whenever this is desired.

Finally, the number of families of elements which have different arrangements in the structure according to the invention cancels out the risk of decohesion.

BRIEF DESCRIPTION OF THE DRAWINGS

FIG. 3 is a schematic diagram illustrating the wound layer as constituting the cylindrical sheet of the family of circumferential elements.

DESCRIPTION OF THE PREFERRED EMBODIMENTS

The following examples of embodiment of a structure according to the invention are given by way of illustration and non-restrictively.

Figure 1:
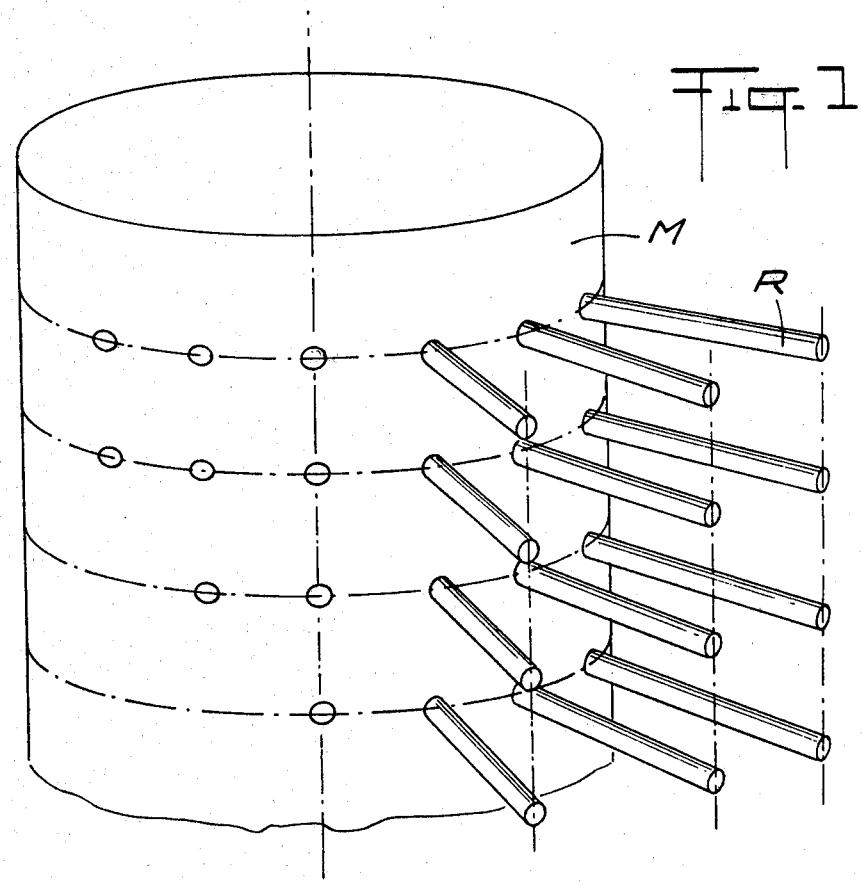
FIG. 1 is a schematic diagram illustrating a limited number of rigid rods extending outwardly from the mandrel defining radial elements.
Figure 2:
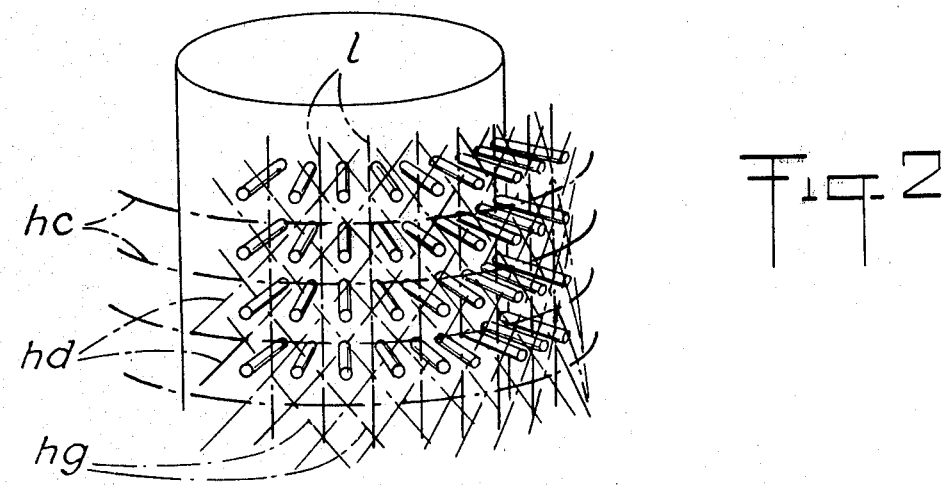
FIG. 2 is a schematic diagram illustrating the passages within which are placed the carbon filaments.

Reference should be made to FIGS. 1 to 3 of the accompanying drawing which diagrammatically illustrate different successive stages of construction of a structure according to the invention.

EXAMPLE 1

1296 perforations of 3 mm diameter and 10 mm depth are made in a cylindrical graphite mandrel M of 80 mm diameter and 300 mm length. Said perforations, oriented perpendicularly to the axis of the mandrel, are evenly spaced out and angularly offset by 10° on an helix whose pitch is equal to 7.2 mm. In each one of these perforations is fitted a rigid rod, 80 mm long and with a 3 mm diameter, so that once fitted-in, 70 mm of the said rod projects from the surface of the mandrel. Said rods are made of uni-directional carbon fibers, bonded by a carbonizable resin such as a phenol resin. Only a number of these rods are shown in FIG. 1, for clarity's sake. The 1296 rods are thus arranged in 36 meridian sheets distributed regularly around the axis of the structure, each sheet containing 36 rods parallel together, evenly spaced out at intervals of 7.2 mm and perpendicular to the axis. They constitute the family of radial elements R of the structure in construction.

These evenly arranged rods define between them passages which prefigure the orientation of the other different families of elements.

As can be seen in FIG. 2, one of these passages follows a helical path hc whose pitch is 7.2 mm, which can practically be considered as a circumferential path. In said passage, which develops over 35 evenly spaced spires, is placed a supple carbon filament of 3 mm diameter formed by over 100,000 carbon fibers assembled together by the twist method which is conventionally used in the textile industry. This first wound layer constitutes the first cylindrical sheet of the family of circumferential elements C (FIG. 3).

The radial rods also define 36 longitudinal passages 1 (FIG. 2) in which could be placed, if necessary, rectilinear elements parallel to the axis, to constitute a family of axial elements, but this possibility is not used in the present example.

Finally, the rods define helical passages, oblique with respect to the longitudinal and circumferential passages. There are thus 36 helical passages of identical pitch in each of the two directions of rotation: "left-hand" (hd) and "right-hand" (hg) by analogy with screw threads, or respectively in "S" form or "Z" form, by analogy with the twisting sense of the textile filament.

Thus there is, on top of the first positioned layer, a second cylindrical layer of carbon filaments in the right-hand helical passages on the right. Said second layer constitutes a first righthand helical sheet HD. To this effect, a continuous filament of 2 mm diameter is used and deposited successively in all the right-hand helical passages by running it to-and-fro between the two side faces of the cylinder formed by the radial rods.

Then, a third layer of filaments of 2 mm is deposited in the same way in the left-hand helical passages, thereby constituting the first left-hand helical cylindrical sheet HG.

More superimposed cylindrical sheets are placed by repeating regulary and in the same order, the afore-described sequence:

one circumferential sheet of filaments of 3 mm diameter, one right-hand helical sheet of filaments of 2 mm diameter, one left-hand helical sheet of filaments of 2 mm diameter.

When this sequence has been repeated ten times, the resulting superimposition of 30 layers of filaments reaches a thickness of 70 mm so that the radial rods no longer project from the winding. In addition to the family of radial elements, a family of circumferential elements, a family of right-hand helical elements and a family of left-hand helical elements have thus been formed each one of these last three families being constituted by co-axial sheets of identical axis to the structure, wherein the elements are evenly spaced out and which are evenly distributed inside the structure in radial orientation.

All the cylindrical sheets of the structure are constituted by the radial juxtaposition of similar groups consisting of a cylindrical sheet of circumferential elements C, a cylindrical sheet of right-hand helical elements HD and of a cylindrical sheet of left-hand helical elements HG.

The next stage in the construction of the structure is the fitting of rectilinear elements in the aligned free spaces existing between the elements of the four families already in place. Indeed, the regularly criss-crossed elements of these four families define lines of rectilinear passages parallel together and regularly spaced out, arranged according to meridian planes intercalated between the meridian sheets of radial rods. Said passages are oblique with respect to the axis of the structure and are divided into two families according to their direction of inclination with respect to said axis. In the case of the present example, these angles are about 44° and 136°, and in each of the passages it is possible to introduce a 100 mm long rectilinear element of 2 mm diameter.

Then all these passages are filled with rigid rods having the aforesaid dimensions. Said rods, just as those of 3 mm, are made of carbon fibers bonded together with a carbonizable resin. They constitute two families of oblique meridian elements MO1 and MO2.

The oblique meridian elements in each of these two families form meridian sheets which are regularly distributed around the axis of the structure and in which the elements are parallel together and evenly spaced out. A meridian sheet of elements MO1 and an adjacent meridian sheet of elements MO2 are found between two consecutive meridian sheets of radial elements. The structure thus supports an assembly of meridian sheets constituted by a regular repetition, around the axis, of the sequence consisting of a meridian sheet of elements MO1, a meridian sheet of elements MO2 and a meridian sheet of elements R.

When all the passages have been filled in this way, the construction of the annular structure is completed. Said structure is finally constituted of six families of filiform elements, three of which are made of incurved elements and three of rectilinear elements. The volume content of reinforcement elements goes decreasing from the inner diameter to the outer diameter, this being perfectly normal for this type of structure, considering the divergent nature of the meridian planes. Said volume content has a value of 0.638 on the level of the inner diameter, and 0.389 on the level of the outer diameter.

There is no interface between two parallel sheets of such a structure which is not traversed through by at least two families of elements with different orientations to ensure a perfect locking and make it entirely undelaminatable.

Said structure can thereafter be converted into composite material by any of the known techniques to introduce a matrix in a three-dimensional structure. The conversion into carbon-carbon composite of the structure described hereinabove can be effected for example by pyrolytic decomposition of gaseous hydrocarbons or by impregnation with a carbonizable resin or with pitch followed by carbonization with or without pressure.

The mandrel on which has been constructed the structure is not integral with the latter and normally needs to be removed. This can be done at any time, before, during or after the conversion into composite material, the moment selected being dependable on the conversion process adopted. The removal of the mandrel can be effected by machining or by dissolving its constitutive material.

The example described hereinabove in detail is but one of the multiple forms which the structure according to the invention can be given. In particular, said structure can be constructed in any material which can take the form of rectilinear or incurved filiform elements whatever the shape and size of their cross-section, and there is nothing preventing several materials of different natures from being associated in one such structure.

EXAMPLE 2

The structure obtained according to this example differs from that obtained in the preceding example in that it is constituted by five families of elements, two of which are made of helical elements, one of axial elements and two of oblique meridian elements.

Said structure can be obtained by proceeding as indicated in the preceding example 1, except that the family of circumferential elements on the one hand, and the family of radial elements on the other hand, are eliminated and replaced by a single family of axial elements of 3 mm diameter, said axial elements fitting-in along each intersecting line between the respectively meridian and cylindrical sheets of the two replaced families.

The axial elements form meridian sheets distributed evenly around the axis of the structure and in which they are regularly spaced out. The meridian sheets of the structure are constituted by the regular repetition around the axis of the structure of the sequence consisting of a meridian sheet of elements MO1, a meridian sheet of elements MO2 and a meridian sheet of axial elements.

It can also be considered that the axial elements form co-axial cylindrical sheets having the same axis as the structure, distributed evenly in radial direction and in which the elements are regularly spaced out. The cylindrical sheets of the structure are then constituted by the juxtaposition in radial direction of similar groups each constituted successively by a cylindrical sheet of axial elements, a cylindrical sheet of right-hand helical elements HD and a cylindrical sheet of left-hand helical elements HG.

EXAMPLE 3

In a structure such as that described in Example 1, half of the circumferential elements of that starting structure (i.e. one cylindrical sheet out of two) and half its radial elements (i.e. one meridian sheet out of two) are replaced by a family of axial elements of 3 mm diameter, said elements fitting-in along each of the intersecting lines of the replaced cylindrical and meridian sheets.

As indicated above with reference to Example 2, the axial elements can be considered as forming meridian sheets or cylindrical sheets. Each meridian sheet of axial elements replaces a meridian sheet on two radial elements of the structure of Example 1. Likewise, each cylindrical sheet of axial elements replaces a cylindrical sheet on two circumferential elements of the structure of Example 1.

The annular structure obtained comprises seven families of elements which can be splitted up into:
 a radial,
 a circumferential,
 an axial,
 two helicals (left-hand and right-hand),
 two oblique meridians.

The examples described hereinabove are in no way restrictive, and of course modifications can be brought to these descriptions without departing from the scope of protection defined by the accompanying claims, which modifications will be particularly concerned with:
 the nature and dimensions of the elements,
 their arrangement within each family,
 the mode of imbrication of the elements of the different families between them,
 the dimensions and proportions of the structure,
 its intended application, etc.

What is claimed is:

1. Annular three-dimensional structure constituted by the regular criss-crossing of filiform elements distributed in a plurality of families of elements, each family being composed of elements of a same type occupying the same particular position within the structure, said structure comprising first and second families of meridian rectilinear elements, oblique with respect to the axis of the structure and forming, in each family, meridian sheets regularly distributed about the axis of the structure, and third and fourth families of helical elements forming, in each family, cylindrical sheets of the same axis as the structure and distributed regularly in radial direction, the inclination with respect to the axis of the elements of the first family being equal but opposite to that of the elements of the second family and the helical paths of the elements of the third family having the same pitch as those of the elements of the fourth family, but with an opposite orientation, structure wherein a fifth family is further provided which is selected from the group constituted by a family of radial elements forming meridian sheets distributed regularly about the axis of the structure, a family of circumferential elements forming cylindrical sheets having the same axis as the structure and distributed regularly in radial direction and a family of axial elements forming meridian or cylindrical sheets distributed regularly in the structure.

2. Structure as claimed in claim 1, wherein said structure comprises an assembly of meridian sheets constituted by the regular repetition, around the axis of the structure, of the sequence consisting of a sheet of oblique meridian elements of the first family, a sheet of oblique meridian elements of the second family and a sheet of radial elements.

3. Structure as claimed in claim 1, wherein said structure comprises an assembly of cylindrical sheets having the same axis as the structure and formed by juxtaposed groups each consisting of a sheet of helical elements of the third family, a sheet of helical elements of the fourth family and a sheet of circumferential elements.

4. Structure as claimed in claim 1, wherein said structure comprises an assembly of meridian sheets constituted by the regular repetition, around the axis of the structure, of the sequence consisting of a sheet of oblique meridian elements of the first family, a sheet of oblique meridian elements of the second family and a meridian sheet of axial elements.

5. Structure as claimed in claim 1, wherein said structure comprises an assembly of cylindrical sheets having the same axis as the structure and formed by juxtaposed groups each one consisting of a sheet of helical elements of the third family, a sheet of helical elements of the fourth family, and a cylindrical sheet of axial element.

6. Structure as claimed in claim 1, wherein said structure comprises a family of radial elements, a family of circumferential elements and a family of axial elements.

7. Structure as claimed in claim 1, wherein said structure comprises an assembly of meridian sheets constituted by the regular repetition, around the axis of the structure, of the sequence consisting of a sheet of oblique meridian elements of the second family, a sheet of radial elements, a sheet of oblique meridian elements of the second family and a meridian sheet of axial elements.

8. Structure as claimed in claim 1, wherein the said structure comprises an assembly of cylindrical sheets having the same axis as the structure and formed by juxtaposed groups each one consisting of a sheet of circumferential elements, a sheet of helical elements of the third family, a sheet of helical elements of the fourth family, a cylindrical sheet of axial elements, a sheet of helical elements of the third family and a sheet of helical elements of the fourth family.

* * * * *